(12) United States Patent  (10) Patent No.:  US 9,395,872 B2
Yamada et al.  (45) Date of Patent:  Jul. 19, 2016

(54) FACILITIES CONTROLLING DEVICE, SCREEN DISPLAYING METHOD, AND RECORDING MEDIUM

(75) Inventors: Isao Yamada, Tokyo (JP); Hiroyuki Yamamoto, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 656 days.

(21) Appl. No.: 13/818,882

(22) PCT Filed: Jul. 22, 2011

(86) PCT No.: PCT/JP2011/066683
§ 371 (c)(1),
(2), (4) Date: Apr. 25, 2013

(87) PCT Pub. No.: WO2012/026252
PCT Pub. Date: Mar. 1, 2012

(65) Prior Publication Data
US 2013/0205221 A1  Aug. 8, 2013

(30) Foreign Application Priority Data

Aug. 25, 2010  (JP) ................................. 2010-188233

(51) Int. Cl.
*G06F 3/0481*  (2013.01)
*G05B 23/02*  (2006.01)
(52) U.S. Cl.
CPC .......... *G06F 3/0481* (2013.01); *G05B 23/0272* (2013.01)
(58) Field of Classification Search
CPC .................................................... G06F 3/0481
USPC ........................................................ 715/748
See application file for complete search history.

(56) References Cited

U.S. PATENT DOCUMENTS

| 2003/0088677 | A1 | 5/2003 | Yamamoto |
| 2007/0083813 | A1 | 4/2007 | Lui et al. |
| 2011/0175701 | A1* | 7/2011 | Kobayashi ............. G05B 15/02 340/3.7 |

FOREIGN PATENT DOCUMENTS

| JP | H9-153189 | 6/1997 |
| JP | 2003-141074 A | 5/2003 |

(Continued)

OTHER PUBLICATIONS

Korean Office Action dated Jan. 10, 2014, from corresponding Korean Application No. 10-2013-7000583.

(Continued)

*Primary Examiner* — Andrea Leggett
(74) *Attorney, Agent, or Firm* — Troutman Sanders LLP

(57) ABSTRACT

A facilities controlling device includes a file acquiring portion that acquires a screen file from a storing portion and acquires a corresponding image file, display script file and processing script file from the storing portion, a data processing portion that acquires, from a device, device data corresponding to data identifying information in the screen file acquired by the file acquiring portion, and performs data processing on the acquired device data based on a processing script in the processing script file corresponding to the device data obtained by the file acquiring portion, and a display processing portion that displays, in a screen, the device data produced by the data processing portion and a symbol of the image file acquired by the file acquiring portion, based on the display script in the display script file acquired by the file acquiring portion.

5 Claims, 19 Drawing Sheets

(56) References Cited

FOREIGN PATENT DOCUMENTS

| JP | 2006-202048 | 8/2006 |
|---|---|---|
| JP | 2007-58388 | 3/2007 |
| JP | 2007-265166 A | 10/2007 |
| JP | 2009-516239 A | 4/2009 |

OTHER PUBLICATIONS

International Search Report dated Sep. 13, 2011, which issued during the prosecution of International Patent Application No. PCT/JP2011/066683.

* cited by examiner

FIG. 2

```
< Screen ID = "113" >
    < Object Type = "AHU" ID = "AHU_1" >
        < Display Portion Selection No = "1" x = "100" y = "100" >
            < Display No = "1" Symbol = "AHU101" Script = "DISP_AHU001.SCR"/>
            ...                     52A                52B
            < Display No = "m" Symbol = "AHU10m" Script = "DISP_AHU00m.SCR"/>
        </Display Portion >          52A                52B
        < Data Portion >
            < Data Type = "Acquiring" Name = "data1" Format = "REAL" Item = "A001"/>
            ...                           53A                           53B
            < Data Type = "Processing" Name = "data2" Format = REAL" Script = "PROC_AHU.SCR" >
                                          53A                          53C
                < Script Argument No = "1" Item = "A001"/>
                ...                        53B
                < Script Argument No = "n" Item = "A00n"/>
            </Data >                        53B
        </Data Portion >
    </Object >
    < Object Type = "AHU" ID = "AHU_2" >
        < Display Portion Selection No = "2" x = "300" y = "500" >
            < Display No = "1" Symbol = "AHU201" Script = "DISP_AHU001.SCR"/>
            ...
            < Display No = "m" Symbol = "AHU20m" Script = "DISP_AHU00m.SCR"/>
        </Display Portion >
        < Data Portion >
            < Data Type = "Acquiring" Name = "data1" Format = "REAL" Item = "B001"/>
            ...
            < Data Type = "Processing" Name = "data2" Format = REAL" Script = "PROC_AHU.SCR" >
                < Script Argument No = "1" Item = "B001"/>
                ...
                < Script Argument No = "n" Item = "B00n"/>
            </Data >
        </Data Portion >
    </Object >
< Screen >
```

Labels: 51, 52, 53 on right side; 52A, 52B, 53A, 53B, 53C as indicated.

FIG. 7

```
< Object Type = "AHU" ID = "" >
  < Display Portion >
    < Display No = "1" Symbol = "" Script = ""/>
      ...
    < Display No = "m" Symbol = "" Script = ""/>
  </Display Portion >
  < Data Portion >
    < Data Type = "Acquiring" Name = "data1" Format = "REAL" Item = ""/>
      ...
    < Data Type = "Processing" Name = "data2" Format = REAL" Script = "" >
      < Script Argument No = "1" Item = ""/>
        ...
      < Script Argument No = "n" Item = ""/>
    </Data >
  </Data Portion >
</Object >
```

FIG. 8

```
< Object Type = "AHU" ID = "" >
   < Display Portion >
      < Display No = "1" Symbol = "AHU001" Script = "DISP_AHU001.SCR"/>
      ...
      < Display No = "m" Symbol = "AHU00m" Script = "DISP_AHU00m.SCR"/>
   </Display Portion >                                                  ⌐— 54
   < Data Portion >
      < Data Type = "Acquiring" Name = "data1" Format = "REAL" Item = ""/>
      ...
      < Data Type = "Processing" Name = "data2" Format = REAL" Script = "" >
         < Script Argument No = "1" Item = ""/>
         ...
         < Script Argument No = "n" Item = ""/>
      </Data >
   </Data Portion >
</Object >
```

FIG. 10

```
< Screen ID = "101" >
  < Object Type = "AHU" ID = "AHU_1" >
    < Display Portion Selection No = "1" x = "100" y = "100" >
      < Display No = "1" Symbol = "AHU101" Script = "DISP_AHU001.SCR"/>
        ...
      < Display No = "m" Symbol = "AHU10m" Script = "DISP_AHU00m.SCR"/>
    </Display Portion >
    < Data Portion >
      < Data Type = "Acquiring" Name = "data1" Format = "REAL" Item = ""/>
        ...
      < Data Type = "Processing" Name = "data2" Format = REAL" Script = "" >
        < Script Argument No = "1" Item = "A001"/>
          ...
        < Script Argument No = "n" Item = "A00n"/>
      </Data >
    </Data Portion >
  </Object >
< Screen >
```
— 55

FIG. 12

```
< Screen ID = "101" >
  < Object Type = "AHU" ID = "AHU_1" >
    < Display Portion Selection No = "1" x = "100" y = "100" >
      < Display No = "1" Symbol = "AHU101" Script = "DISP_AHU001.SCR"/>
      ...
      < Display No = "m" Symbol = "AHU10m" Script = "DISP_AHU00m.SCR"/>
    </Display Portion >
    < Data Portion >
      < Data Type = "Acquiring" Name = "data1" Format = "REAL" Item = "A001"/>
      ...
      < Data Type = "Processing" Name = "data2" Format = REAL" Script = "PROC_AHU001.SCR" >
        < Script Argument No = "1" Item = "A001"/>
        ...
        < Script Argument No = "n" Item = "A00n"/>
      </Data >
    </Data Portion >                                                    ⌐ 56
  </Object >
< Screen >
```

FIG. 13

```
< Screen ID = "201" >
    < Object ID = "101"/>
    < Object ID = "102"/>
    < Object ID = "103"/>
    < Object ID = "104"/>
    ...
</Screen >                    ⌐57
```

FIG. 16

```
< Screen ID = "110" >
< Object Type = "AHU" ID = "AHU_1" >
< Display Portion Selection No = "1" x = "100" y = "100" >
  < Display No = "1" Symbol = "AHU101" Script = "DISP_AHU001.SCR"/>
  ....
</Display Portion >
< Data Portion >
  < Data Type = "Acquiring" Name = "Air-Conditioning Operating Status" Type = "BOOL" Item = "A001" Category = "IO"/>
  < Data Type = "Acquiring" Name = "Supply Air Temperature" Type = "REAL" Item = "A002" Category = "IO"/>
  < Data Type = "Acquiring" Name = "Exchange Air Temperature" Type = "REAL" Item = "A003" Category = "IO"/>
  < Data Type = "Acquiring" Name = "Outside Air Temperature" Type = "REAL" Item = "A004" Category = "IO"/>
  < Data Type = "Acquiring" Name = "Operating RPM" Type = "UNIT" Item = "A011" Category = "Asset"/>
  < Data Type = "Acquiring" Name = "Operating Time" Type = "REAL" Item = "A012" Category = "Asset"/>
</Data Portion >
</Object >
</Screen >
```

FACILITIES CONTROLLING DEVICE, SCREEN DISPLAYING METHOD, AND RECORDING MEDIUM

CROSS REFERENCE TO RELATED APPLICATIONS

This application is a U.S. National Phase application under 35 U.S.C. §371 of International Application No. PCT/JP2011/066683, filed on Jul. 22, 2011, which claims priority to Japanese Patent Application No. 2010-188233, filed on Aug. 25, 2010. The International Application was published in Japanese on Mar. 1, 2012, as WO 2012/026252 under PCT Article 21(2). The entire contents of all of the above applications are hereby incorporated herein by reference.

FIELD OF TECHNOLOGY

The present invention relates to a facilities controlling technology, and, in particular, relates to a screen displaying technology for displaying, in a screen, device data relating to individual devices provided in the facilities.

BACKGROUND ART

In facilities, such as plants and buildings, and the like, structured from various types of devices, a facilities controlling device is used in order to control these devices efficiently, where data pertaining to these devices is displayed on a screen.

Conventionally, in this type of facilities controlling device, not only have specified processes been performed, such as time control, communications processes, monitoring of device statuses, starting and stopping operation of devices, and the like, in response to operations by operators, but also operating statuses of devices, and data pertaining to facilities control, such as status monitoring and warning monitoring, has been controlled and displayed in respective screens, and when there has been a change in the status of a device being monitored, the operator would be notified of the change in status through a screen display, or the like. See, for example, Japanese Unexamined Patent Application Publication H9-153189.

Moreover, in such a facilities controlling device, for the statuses of control points that are provided in the facilities, the statuses of the individual control points would be displayed in a screen in correspondence to the locations of the individual control points in a screen showing the layout of the facility. Moreover, control points have been displayed as symbols, and the statuses of the individual control points have been displayed through changing the display colors thereof. See, for example, Japanese Unexamined Patent Application Publication H9-153189.

In this type of facilities controlling device, when data acquired from a device is displayed in the screen, it has been necessary to perform the screen display after performing calculation processes on the device data that has been acquired from the device. For example, for device data acquired from a device, in some cases data processing procedures, such as encoding or normalization, have been performed depending on the data transmission method used by the device. Because of this, as-is screen display of the device data acquired from the devices has not been possible, but rather it has been necessary to use processing scripts in order to change into actual numerical values to be displayed in the screen the device data that have been acquired.

However, in the equipment controlling devices of the conventional technology, as described above, when displaying in a screen data pertaining to facilities control, such as the operating statuses of the devices, status monitoring, warning monitoring, and the like, processing scripts have been written in the display scripts that are unique to the individual screens. Because of this, in scripts for different displays, it is necessary to write individual processing scripts for each, even if identical data processes are to be performed. Consequently, when adding new data display screens or changing data display screens, it is necessary to include processing scripts as well, and thus there has been a problem in that there has been a large amount of wasted work in generating display scripts, and a problem in that this has been inefficient.

The present invention is to solve the problem set forth above, and an aspect thereof is to provide a screen displaying technology wherein it is possible to generate and set up device data display screens efficiently.

SUMMARY

In such an aspect, a facilities controlling device according to the present invention includes a storing portion that stores a plurality of image files used when displaying various types of devices, which structure the facilities, in a screen using symbols, a plurality of display script files used when displaying the image files in a screen, a plurality of processing script files used when processing device data acquired from the devices, and a screen file, for each screen corresponding to an objective of control, including image file identifying information indicating the image file for the device to be displayed in the screen, display script file identifying information indicating the display script file for the image file, data identifying information indicating the device data to be displayed in the screen, and processing script file identifying information indicating the processing script file for the device data, a file acquiring portion that acquires, from the storing portion, the screen file pertaining to the screen in response to a display request operation specifying any given screen, and acquires the corresponding image file, display script file and processing script file from the storing portion, based on the file identifying information, the display script file identifying information, and the processing script file identifying information written in the screen file, a data processing portion that acquires, from a device, device data corresponding to the data identifying information written in the screen file acquired by the file acquiring portion, and performs data processing on the acquired device data based on the processing script written in a processing script file corresponding to the device data obtained by the file acquiring portion, and a display processing portion that displays, in a screen, the device data produced by the data processing portion and the symbol of an image file acquired by the file acquiring portion, based on the display script written in the display script file acquired by the file acquiring portion.

Moreover, a screen displaying method according to the present invention includes a storing step wherein a storing portion stores a plurality of image files used when displaying various types of devices, which structure the facilities, in a screen using symbols, a plurality of display script files used when displaying the image files in a screen, a plurality of processing script files used when processing device data acquired from the devices, and a screen file, for each screen corresponding to an objective of control, including image file identifying information indicating the image file for the device to be displayed in the screen, display script file identifying information indicating the display script file for the image file, data identifying information indicating the device data to be displayed in the screen, and processing script file identifying information indicating the processing script file for the device data, a file acquiring step wherein a file acquiring portion acquires, from the storing portion, the screen file pertaining to the screen in response to a display request operation specifying any given screen, and acquires the corresponding image file, display script file and processing script file from the storing portion, based on the file identifying information, the display script file identifying information, and the processing script file identifying information written in the screen file, a data processing step wherein a data processing portion acquires, from a device, device data corresponding to the data identifying information written in the screen file acquired by the file acquiring portion, and performs data processing on the acquired device data based on the processing script written in a processing script file corresponding to the device data obtained by the file acquiring portion, and a display processing step wherein a display processing portion displays, in a screen, the device data produced by the data processing portion and the symbol of an image file acquired by the file acquiring portion, based on the display script written in the display script file acquired by the file acquiring portion.

The present invention makes it possible to perform set up through separating the processing script used in acquiring and processing device data, and the display script used in displaying symbols, for each device object displayed on the screen. Consequently, when identical data processing is performed for different objects, it is possible to use a single processing script for the respective objects. Because of this, this eliminates the need to include a processing script when adding or modifying a data display screen, making it possible to eliminate the waste of the work in generating the display script, making it possible to generate and set up device data display screens efficiently.

BRIEF DESCRIPTION OF THE DRAWINGS

FIG. 2 is an example of a structure of critical portions in a screen file.

FIG. 7 is an example of a structure of critical portions in an object template.

FIG. 8 is an example of a structure of critical portions in a replicated object template.

FIG. 10 is an example of a structure of critical portions in a image file added by a replicated object template.

FIG. 12 is an example of a structure of critical portions of a receive file wherein an object has been set up.

FIG. 13 is an example of a structure of critical portions in a screen file according to Another Example.

FIG. 16 is an example of a structure of critical portions in a screen file according to Yet Another Example.

DETAILED DESCRIPTION

Forms for carrying out the present invention will be explained next in reference to the figures.

Example

Figure 1:
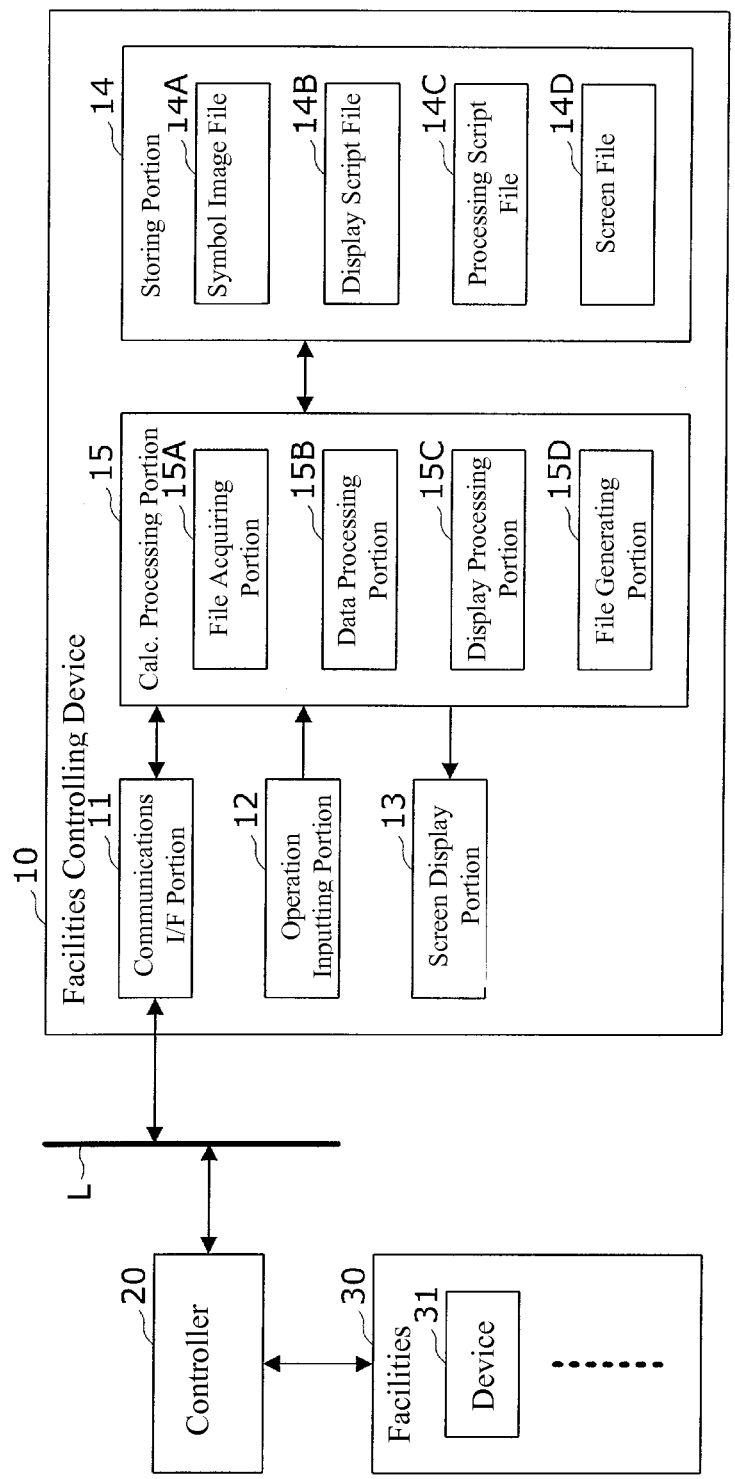
FIG. 1 is a block diagram illustrating a structure of a facilities controlling device according to Example.

First a facilities controlling device according to Example according to the present invention will be explained in reference to FIG. 1.

This facilities controlling device, as a whole, is made from an information processing device such as a server device, and has functions for using device data, acquired, through a controller 20, from the various types of devices 31 that structure the facilities 30, to display the various types of data required for controlling the facilities 30, on various types of screens depending on the respective purposes for control.

In the Example, a plurality of image files that are used when displaying screens with the devices 31 as symbols, a plurality of display script files used when displaying on-screen the image files, a plurality of processing script files used when processing device data, and, for each screen, a screen file that includes image file identifying information indicating a image file for a device 31 to be displayed in the screen, display script file identifying information for indicating the display script file for the image file, data identifying information for indicating the device data to be displayed in the screen, and processing script file identifying information for indicating the processing script file for the device data, are stored in a storing portion.

In addition, in response to a display request operation indicating any given screen, the screen file pertaining to that screen is acquired from the storing portion, and, based on the image file identifying information, display script file identifying information, and processing script file identifying information written in that screen file, the corresponding image files, display script files, and processing script files are acquired from the storing portion, and the device data corresponding to the data identifying information written in the screen file that has been acquired are acquired from the devices 31, the device data that have been acquired are processed by the processing script files corresponding to the device data acquired by the file acquiring portion, and the processed data that are produced, and the symbols of the image files acquired by the file acquiring portions are displayed in the screen based on the display scripts written in the display script files acquired by the file acquiring portion.

The Facilities Controlling Device

A structure of the facilities controlling device 10 according to the Example will be explained in detail next in reference to FIG. 1.

The facilities controlling device 10 is provided with a communication interface portion (hereinafter termed the communication I/F portion) 11, an operation inputting portion 12, a screen displaying portion 13, a storing portion 14, and a calculation processing portion 15, as the primary functional portions thereof.

The communication I/F portion 1 is made from a dedicated data communication circuit, and has the function of performing data communication with external devices, such as the controllers 20 that are connected through a communication circuit L.

The operation inputting portion 12 is made from an operation inputting device, such as a keyboard or a mouse, and has a function for detecting operations by an operator and outputting them to the calculation processing portion 15.

The screen displaying portion 13 is made from a screen displaying device, such as an LCD or PDP, and has a function for displaying various types of screens, such as menu screens and facilities controlling screens, in response to instructions from the calculation processing portion 15.

The storing portion 14 is made from a storage device such as a hard disk or semiconductor memory, and has a function for storing various types of processing information and programs 14P used in the processing operations by the calculation processing portion 15. The programs 14P are read, in advance, in from an external device that is connected by the communication line L or from a recording medium, and stored in the storing portion 14.

As the main processing information stored in the storing portion 14 there are the symbol image files 14A, the display script files 14B, the processing script files 14C, and the screen files 14D. Some or all of these may be stored in an external device, such as a data server that is connected through the communication line L, and read out through the communication I/F portion 11 when necessary.

The symbol image file 14A is a file used when displaying a device 31 in a screen using a symbol. The symbol is an image wherein the device 31 is abstracted, and is used when displaying, in a screen, the installation locations and connection relationships of the devices 31.

The display script file 14B is a file wherein is written the display script that is used when displaying the symbol image file 14A on-screen. This display script file is a script for displaying a symbol of the symbol image file 14A at an arbitrary position in the screen, in an arbitrary size.

The processing script file 14C is a file wherein is written a processing script used when processing device data acquired from the device 31. The processing script is a script for converting the actual numeric values through calculation processes on the device data, which is normalized or encoded.

The screen file 14D is a file wherein is written various types of information pertaining to the display format of the screen, generated for each type of screen depending on the respective purposes of control. The screen file 14D includes, as its main information, image file identifying information for identifying the symbol image file 14A for the devices 31 displayed in the screen, the display script file identifying information indicating the display script file 14B for the symbol image file 14A, data identifying information indicating the device data to be displayed by the screen, and processing script file identifying information indicating the processing script file 14C for the device data.

In FIG. 2, the screen file is written in the same tagged format as HTML, where, in the screen tag at the beginning, "113" is set as the identifying information "ID" of the screen that is displayed by the screen file.

An object field 51 is provided for each device 31 that will be displayed in the screen, where the format information pertaining to the device 31 is written within the object field 51. The object field 51 is provided with a display portion field 52 for describing the format information relating to the display, and a data portion field 53 for describing the format information pertaining to the device data.

In the display portion field 52, image file identifying information 52A that indicates a symbol image file 14A for the symbol used in that display format, and display script file identifying information 52B indicating a display script file 14B for that symbol are written for display formats for each device 31 corresponding to the object field 51.

For example, for the display format of "No=1," there is the notation that the image file of the image file identifying information "AHU101" is to be displayed by the display script file of the display script file identifying information "DISP_AHU001.SCR."

In the data portion field 53, data name information 53A, data identifying information 53B, processing script file identifying information 53C, and so forth, are written as information pertaining to acquiring or processing device data, for the device data relating to each device 31 corresponding to the object field 51.

For example, for the real-number device data of the data name information "data1," there is the description that the device data corresponding to the data identifying information "A001" is to be acquired. For the real-number device data of data name information "data2," there is the description that the device data corresponding to the data identifying information "A001" through "A00n" is to be processed by the processing script file of the processing script file identifying information "PROC_AHUA.SCR."

The calculation processing portion 15 has a microprocessor, such as a CPU, and the peripheral circuitry thereof, and has functions for achieving the various types of processing portions through reading and executing a program 14P from the storing portion 14.

As the main processing portions accomplished by the calculation processing portion 15 there is the file acquiring portion 15A, the data processing portion 15B, the display processing portion 15C, and the file generating portion 15D.

The file acquiring portion 15A has a function for acquiring, from the storing portion 14, the screen file 14D corresponding to a screen in response to a display request operation that specifies an arbitrary screen, detected by the operation inputting portion 12, and a function for acquiring, from the storing portion 14, the corresponding image file 14A, display script file 14B, and processing script file 14C based on the image file identifying information 52A, the display script file identifying information 52B, and the processing script file identifying information 53C written in the screen file 14D.

The data processing portion 15B has a function for acquiring, from the devices 31, through the communication I/F portion 11 and the controllers 20, the device data corresponding to the data identifying information 53B that is written in the screen file 14D that has been acquired by the file acquiring portion 15A. At this time, if an acquiring script corresponding to the device data is written in the processing script file 14C corresponding to the device data, acquired by the file acquiring portion 15A, then that device data is acquired based on the acquiring script.

Furthermore, the data processing portion 15B has a function for processing the acquired device data based on the processing script if a processing script for the acquired device data is written in the processing script file 14C corresponding to the device data acquired by the file acquiring portion 15A.

The display processing portion 15C has a function for generating instances of objects from the screen file 14D, and a function for displaying, by the screen displaying portion 13, a screen corresponding to the screen file 14D based on the device data produced by the data processing portion 15B, and the display scripts written in the display script files 14B acquired by the file acquiring portion 15A, using the symbols in the symbol image files 14A acquired by the file acquiring portion 15A.

The file generating portion 15D has a function for generating, editing, and storing to the storing portion 14, display script files 14B, processing script files 14C, and screen files 14D, in response to operator operations detected by the operation inputting portion 12.

Operation of the Example

The operation of the facilities controlling device 10 according to the Example will be explained next in reference to FIG. 3.

Figure 3:
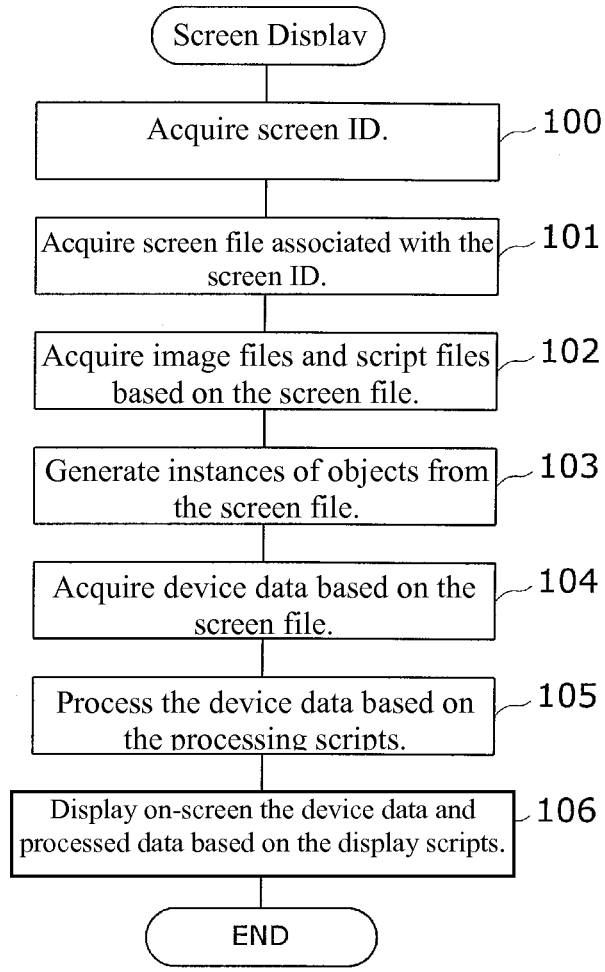
FIG. 3 is a flowchart illustrating the screen displaying process in the facilities controlling device.
Figure 4:
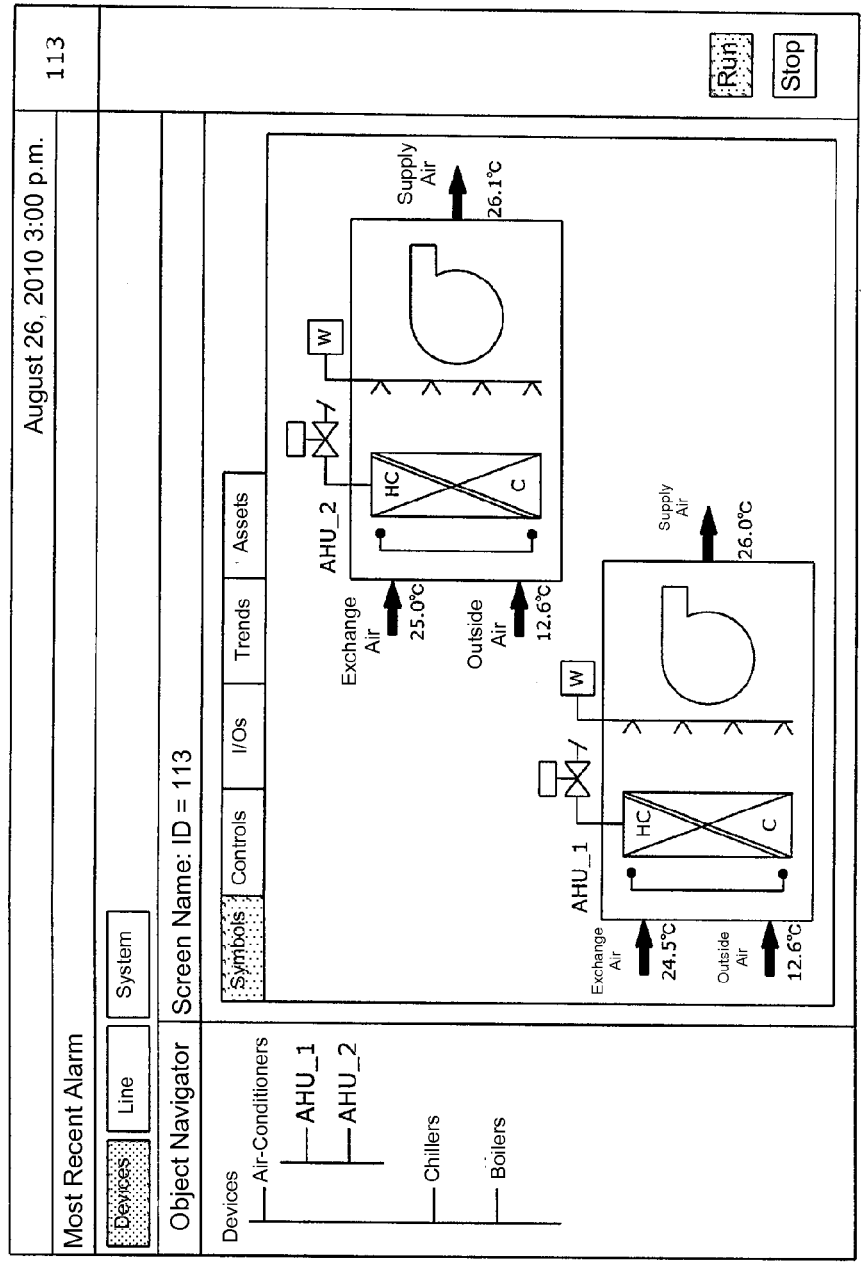
FIG. 4 is an example of a screen display.

The calculation processing portion 15 of the facilities controlling device 10 commences execution of the screen displaying procedure of FIG. 3 in response to a screen display request operation by an operator, detected by the operation inputting portion 12.

First, the file acquiring portion 15A, in response to a screen display request operation by an operator, acquires the screen ID of the screen for which the display is requested, indicated by the screen display request operation (Step 100), and acquires, from the storing portion 14, the screen file 14D related to that screen ID (Step 101).

Following this, the file acquiring portion 15A acquires, from the storing portion 14, the corresponding image files 14A, display script files 14B, and processing script files 14C based on the image file identifying information 52A, the display script file identifying information 52B, and the processing script file identifying information 53C written in the screen file 14D (Step 102).

Following this, the display processing portion 15C generates an instance for each object corresponding to each device to be displayed in the screen, based in the screen file 14D (Step 103).

Furthermore, the data processing portion 15B acquires, from each device 31, through the communication I/F portion 11 and the controllers 20, based on the acquiring script, device data corresponding to the data identifying information 53B written in the screen file 14D (Step 104), and processes the device data based on the processing script (Step 105).

Thereafter, the display processing portion 15C displays, in the screen displaying portion 13, the screen corresponding to the screen file 14D, based on the display scripts written in the display script files 14B acquired by the file acquiring portion 15A, using the instance for each individual object, the device data acquired by the data processing portion 15B, and the symbols of the symbol image files 14A acquired by the file acquiring portion 15A (Step 106), and the series of screen displaying procedures is terminated.

In an example of a screen display shown in FIG. 2, the screen displayed based on the example of the screen file of FIG. 2 is illustrated. Symbols for two objects, AHU_1 and AHU_2, indicating air-conditioning equipment, are displayed in the screen, and, for each symbol, the exchange air temperature, outside air temperature, and supply air temperature are displayed as the processed device data acquired from the corresponding devices 31.

Screen File Generation

The operations for generating a screen file in the file generating portion 15D will be explained next in reference to FIG. 5.

Figure 5:
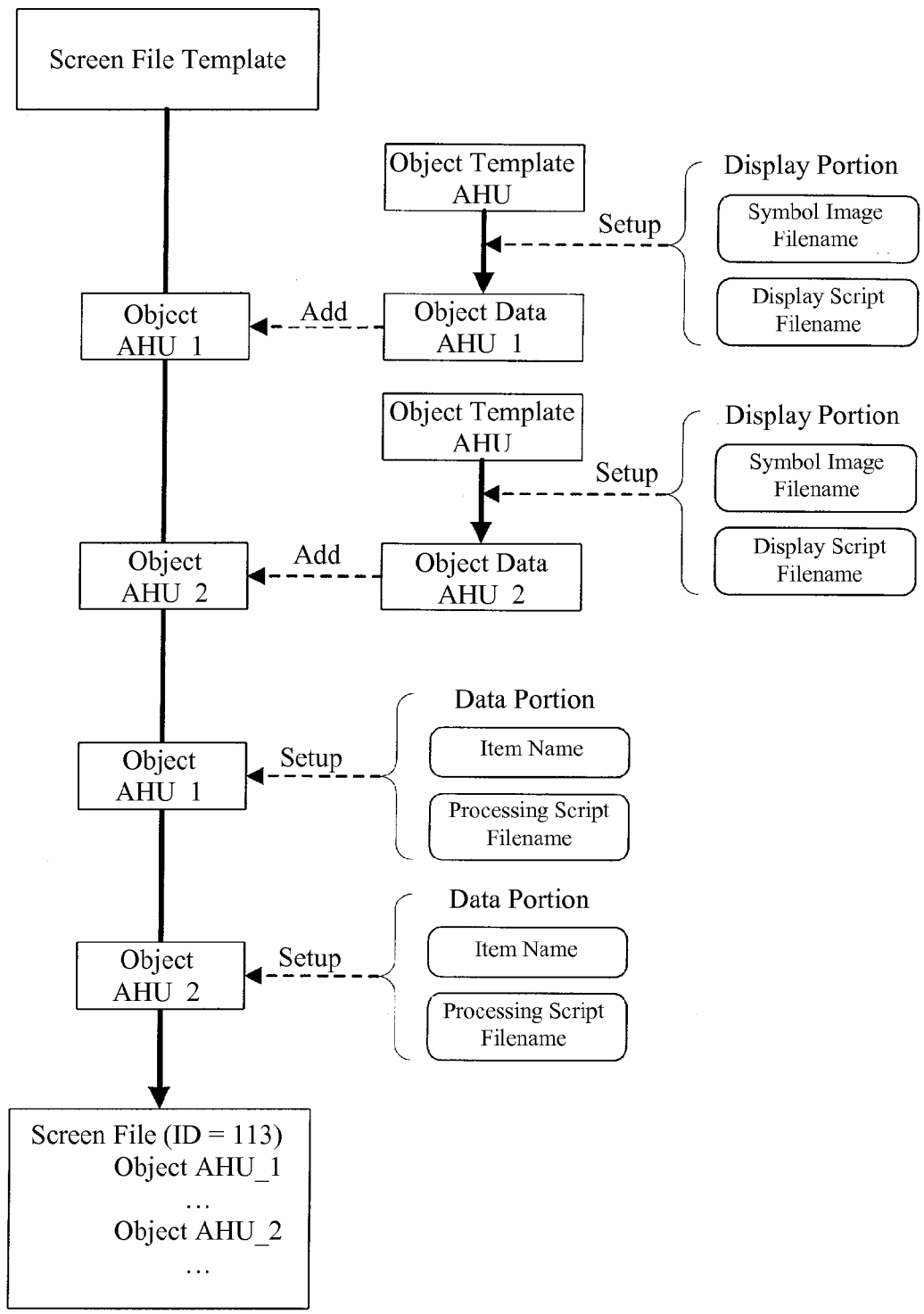
FIG. 5 is a flowchart illustrating a screen file generating procedure.

The file generating portion 15D starts execution of the screen file generating process of FIG. 5 in response to a screen file generation request operation by an operator, detected by the operation inputting portion 12.

First, the file generating portion 15D acquires, from the storing portion 14, an object template corresponding to an object indicated by an object selecting operation in response to an object selecting operation by an operator, and, in response to an input operation by an operator, sets up, in an object template displaying portion, a symbol image file name and a display script file name to be used for displaying the object, and then replicates the object template. In the example in FIG. 5, two template data AHU_1 and AHU_2 are replicated from one object template AHU.

Figure 6:
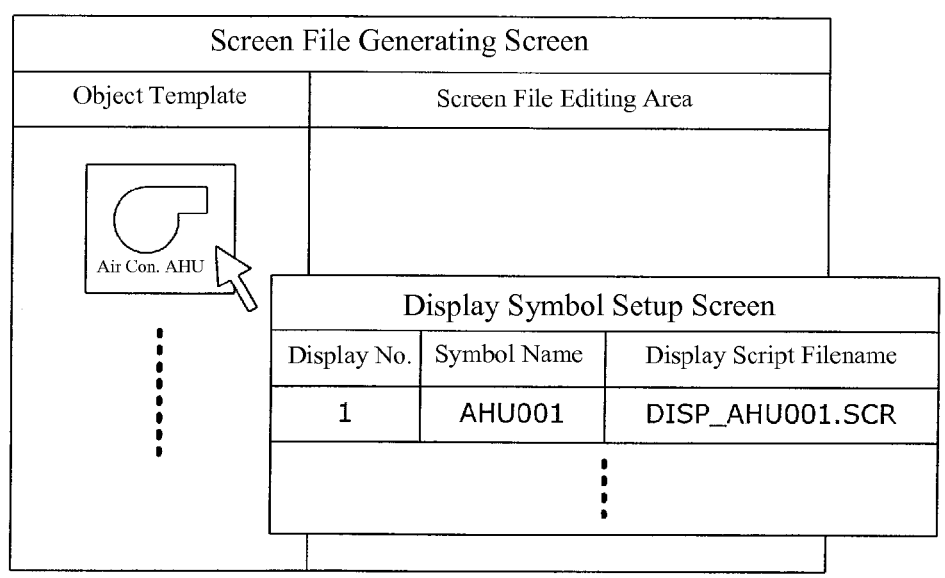
FIG. 6 is an explanatory diagram illustrating an object template replicating operation.

As shown in FIG. 6, a screen file generating screen is displayed in the screen displaying portion 13 in response to a screen file generation request operation. The screen file generating screen is provided with an object template area and a screen file editing area. Symbols indicating the templates for individual objects that have been prepared in advance are displayed in the object template area, and a pop-up display of a display symbol pop-up screen is displayed through performing an object selecting operation by clicking any given symbol with the mouse. The symbol image file name and display script file name are set up in the object template display portion through inputting operations in the display symbol setup screen, and the object template is replicated.

As shown in FIG. 7, the object template is format data pertaining to the description of the object in the screen file 14D, and is stored in advance in the storing portion 14 for each type of device 31. Here, for convenience, and object template wherein the parameters have been set for an actual device 31 will be termed a "replicated object template."

As shown in FIG. 8, in a replicated object template, the symbol image file name and display script file name are set into the display portion for the object template in FIG. 7.

Thereafter, the file generating portion 15D, in response to object adding operations by the operator, acquires a screen file template from the storing portion 14 and adds the replicated object template to the screen file template as a new object field to generate a new image file. The screen file template is format data regarding the description of the screen file 14D, and is stored in advance in the storing portion 14.

Following this, the file generating portion 15D sets up, in the data portion of each object field that has been added to the screen file template, an item name and processing script name pertaining to the device data displayed for each object, in response to inputting operations by the operator, and stores the result to the storing portion 14 as a screen file 14D. In the example in FIG. 5, item names and processing script names are set up for each of the objects AHU_1 and AHU_2.

Figure 9:
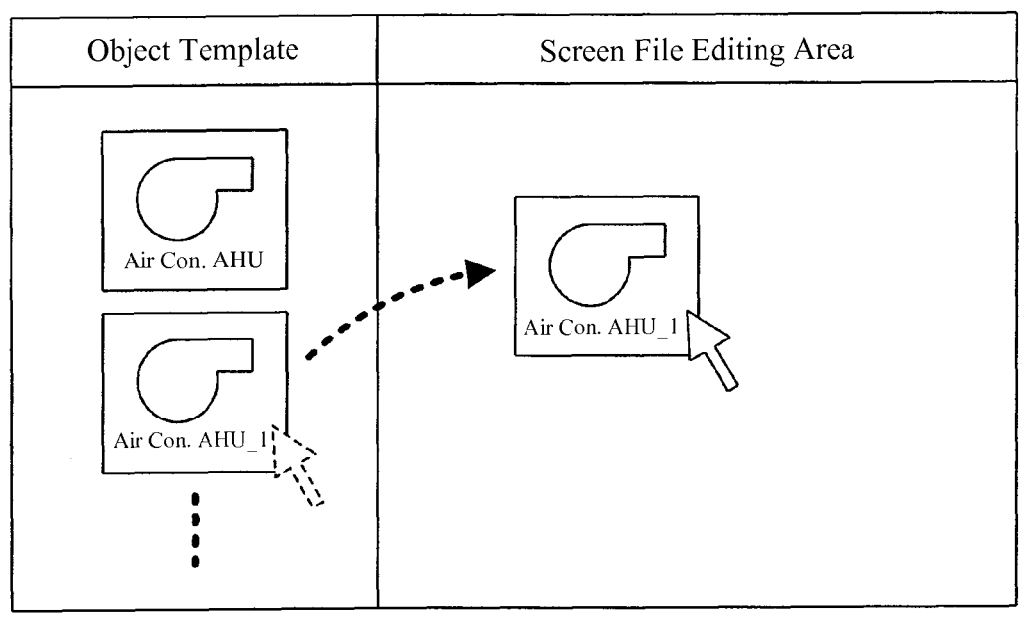
FIG. 9 is an explanatory diagram illustrating a screen file generating operation.

As shown in FIG. 9, symbols indicating the replicated object templates are added to the object template area of the screen file generating screen. The content of the replicated object data template can be added to the screen file template by performing an object adding operation by dragging and dropping a symbol with the mouse. A symbol indicating the added object is displayed in the screen file editing area.

As shown in FIG. 10, the content of the replicated object template AHU_1 can be seen as added as an object field 55.

Thereafter, the file generating portion 15D, in response to an object setup request operation in the screen file editing area by the operator, selects an arbitrary object that has been added, and, in response to an inputting operation by the operator, sets up, in the data portion of the applicable object field in the screen file 14D, the item IDs and processing script file names for the device data used in displaying the object. In the example in FIG. 5, the two added objects AHU_1 and AHU_2 are set up.

Figure 11:
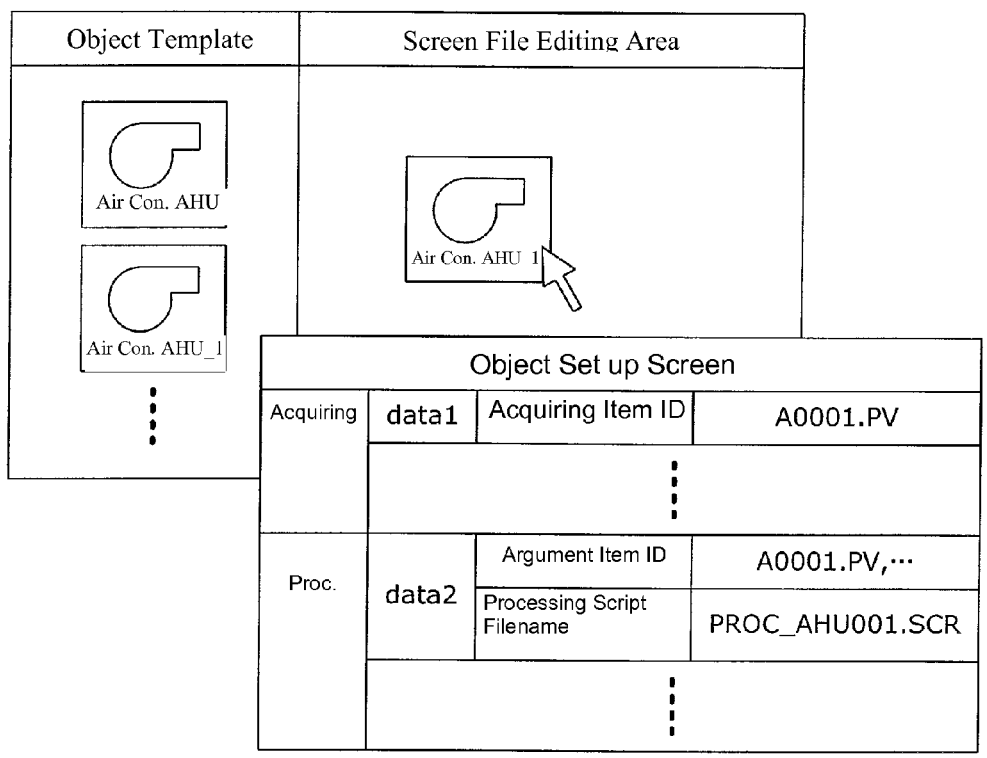
FIG. 11 is an explanatory diagram illustrating an object setup operation.

As shown in FIG. 11, a pop-up display of the object setup screen is displayed through the performance of an object setup request operation by clicking, with the mouse, the symbol of an object that has been added, displayed in the screen file editing area of the screen file generating screen. The item ID and processing script file name for each device data is set up in the data portion of the object field through inputting operations in the object setup screen, and a receive file is generated.

As shown in FIG. 12, the item ID and processing script file name for the device data are set up in the data portion 56 of the object AHU_1.

In this way, the screen file 14D as illustrated in FIG. 2, described above, is completed, and stored to the storing portion 14, through performing the setup of the additional object field.

Effects of the Example

In this way, the Example is one wherein, in response to a display request operation indicating any given screen, a screen file 14D pertaining to that screen is acquired from the storing portion 14 by the file acquiring portion 15A, the corresponding image files 14A, display script files 14B, and processing script files 14C are acquired from the storing portion 14 based on the image file identifying information, display script file identifying information, and processing script file identifying information written in the screen file 14D, the device data corresponding to the data identifying information of the screen file 14D is acquired from the devices, the device data corresponding to the data identifying information of the screen file 14D is produced by the data processing portion 15B, the acquired device data is processed based on the processing script of the processing script file 14C corresponding to the device data, and the device data and the symbols of the image files acquired by the file acquiring portion are displayed in a screen by the display processing portion 15C based on the display scripts of the display script files 14B.

This makes it possible to perform set up through separating the processing script used in acquiring and processing device data, and the display script used in displaying symbols, for each device object displayed on the screen. Consequently, when identical data processing is performed for different objects, it is possible to use a single processing script for the respective objects. Because of this, this eliminates the need to include a processing script when adding or modifying a data display screen, making it possible to eliminate the waste of the work in generating the display script, making it possible to generate and set up device data display screens efficiently.

Another Example

A facilities controlling device 10 according to Another Example according to the present invention will be explained next.

In the Example, the explanation was for an example of a case wherein an object field was written for each of the devices in the screen file 14D when displaying data for a plurality of devices in the screen. In the Another Example, the explanation will be for a case wherein there is a transition to another screen from a screen that is displayed, through the creation of a hierarchy of screen files 14D.

In the facilities controlling device 10 according to the Another Example, the screen file 14D is hierarchical. Specifically, the screen file 14D of FIG. 13 includes screen identifying information 57 that indicates a screen file related to a transition destination screen. Here the screen file of the transition destination screen is generated in advance and stored in the storing portion 14.

Moreover, the file acquiring portion 15A has a function for acquiring, from the storing portion 14, a screen file 14D relating to the object of a symbol, replacing the screen file 14D relating to the screen that is currently displayed, in response to a screen transitioning operation by an operator on a symbol that is displayed in the screen.

The other structures in the facilities controlling device 10 according to the Another Example are identical to those in the Example, and thus explanations thereof are omitted here.

Operation of the Another Example

The operation of the facilities controlling device 10 according to the Another Example will be explained next.

Figure 14:
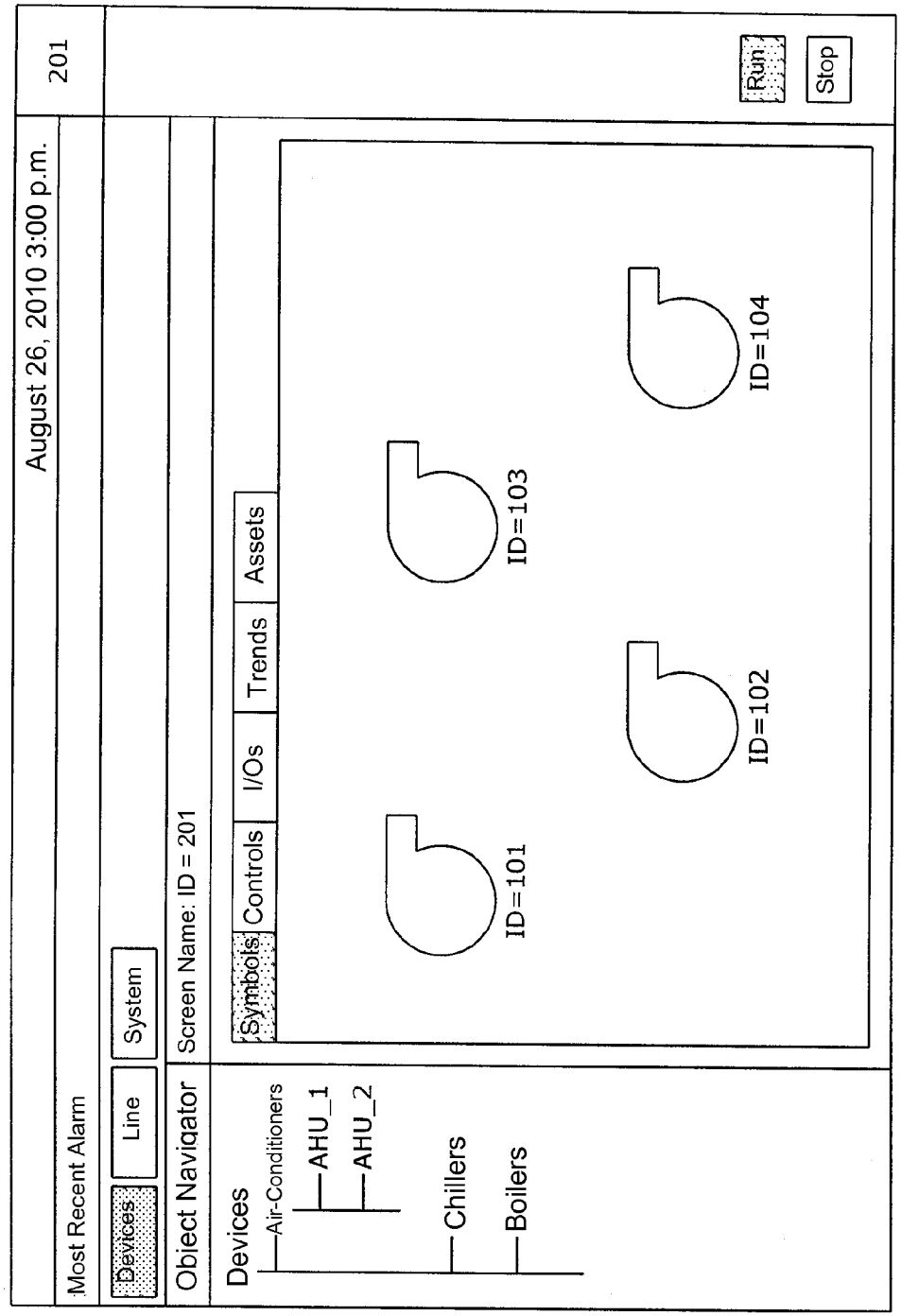
FIG. 14 is an example of a screen display using a hierarchical screen file.

In an example of a screen display shown in FIG. 14, symbols for four air-conditioning equipment, having IDs=101 through 104, are displayed based on the example structure in FIG. 13.

In this screen, if, for example, a screen switching operation were performed by clicking the ID=101 symbol with the mouse, then the file acquiring portion 15A would acquire, from the storing portion 14, the screen file 14D relating to the object of that symbol.

Thereafter, procedures that are identical to Step 102 through 106 in FIG. 3, described above, are executed, and the transition destination screen, such as a detail screen for the applicable object, is displayed by the screen displaying portion 13.

Figure 15:
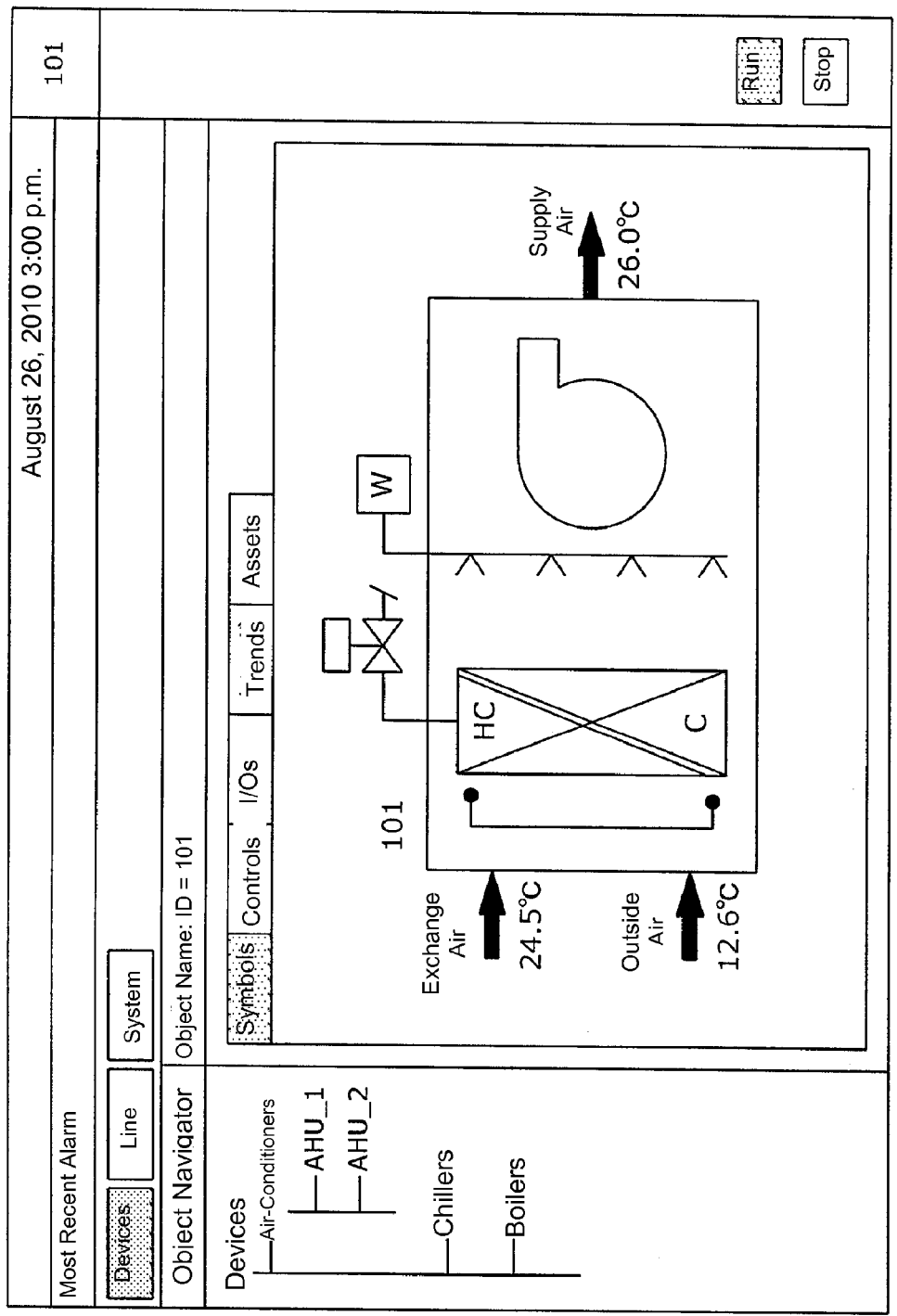
FIG. 15 is an example of a screen display of a transition destination screen.

In an example of a screen display of a transition destination screen, shown in FIG. 15, a detail screen pertaining to the air-conditioning equipment of ID=101 is displayed.

Note that when it comes to generating the hierarchical screen file, if a screen file 14D for the object of the applicable symbol already exists in the storing portion 14 when the symbol is dropped into the screen file editing area in, for example, FIG. 9, described above, then, instead of adding a replicated object template to the screen file 14D that is being generated, as described above, screen identifying information indicating the screen file 14D may be written into the screen file 14D that is being generated.

Effects of the Another Example

As described above, in the Another Example screen identifying information that indicates a screen file pertaining to the transition destination screen to which there will be a transition from the screen in the screen file 14D is written in advance in the screen file 14D, and the screen file 14D pertaining to the transition destination screen, which is to be displayed instead of the screen that is currently being displayed is acquired by the file acquiring portion 15A based in the screen identifying information included in the screen file 14D, in response to a display switching request operation to the transition destination screen, thus making it extremely easy to accomplish a screen transition.

Yet Another Example

A facilities controlling device 10 according to Yet Another Example according to the present invention will be explained next.

A case wherein a new screen file 14D was acquired to transition to another screen from the screen that is currently displayed was explained in the Another Example. A case wherein device data that is currently being displayed is switched using a screen file 14D of a screen that is currently displayed will be explained in the Yet Another Example.

As shown in FIG. 16, in the facilities controlling device 10 according to the Yet Another Example, category-specific information, depending on the type of data, is set up in the data identifying information (items) for each individual device data written in the data portion of a screen file 14D.

Moreover, the display processing portion 15C has a function for selecting, from device data acquired by the data processing portion 15B, device data having category identifying information specified by a display data switching request operation, in response to a display data switching request operation for the device data by an operator, and a function for displaying the selected device data in a screen by the screen displaying portion 13.

Operation of the Yet Another Example

The operation of the facilities controlling device 10 according to the Yet Another Example will be explained next in reference to FIG. 17.

Figure 17:
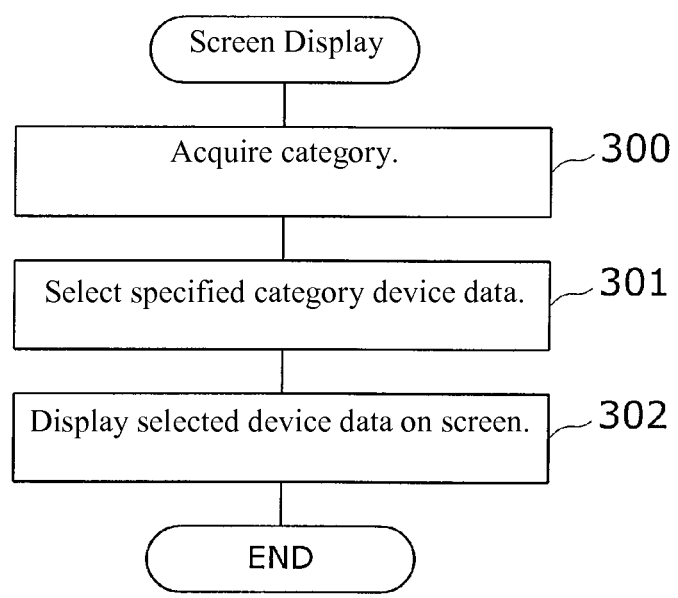
FIG. 17 is a flowchart illustrating a display data switching process of the facilities controlling device according to the Yet Another Example.

The calculation processing portion 15 of the facilities controlling device 10 commences execution of the display data switching process of FIG. 17 in response to a display data switching request operation by the operator, detected by the operation inputting portion 12. Here device data as written in any given screen file 14D has already been acquired from the devices 31 by the data processing portion 15B, and have already been processed by the processing scripts for these device data. The display data of the category that is indicated by default in the screen file 14D are displayed in the screen.

First the file acquiring portion 15A acquires the display request category identifying information indicated by the display data switching request operation in response to a display data switching request operation in the screen that is currently displayed (Step 300).

Following this, the display processing portion 15C, in response to a display data switching request operation by the operator, selects, from the device data already acquired by the data processing portion 15B, the device data having the category identifying information indicated by the display data switching request operation (Step 301), and the selected device data is displayed in the screen by the screen displaying portion 13 (Step 302), after which the series of display data switching procedures is terminated.

If, for example, the default category is set to "Symbols," then when the object screen is first displayed then the device symbols will be displayed in the screen, as illustrated in FIG. 15, described above. Tags for display data switching request operations appearing as "Symbols," "Controls," "I/Os," "Trends," and "Assets," are provided at the top edge of the screen.

On the other hand, in the example screen file in FIG. 16, the "I/O" category is set for the device data of items "A001" through "A004" in the data portion, and "Asset" is set for the category in items "A011" and "A012."

Figure 18:
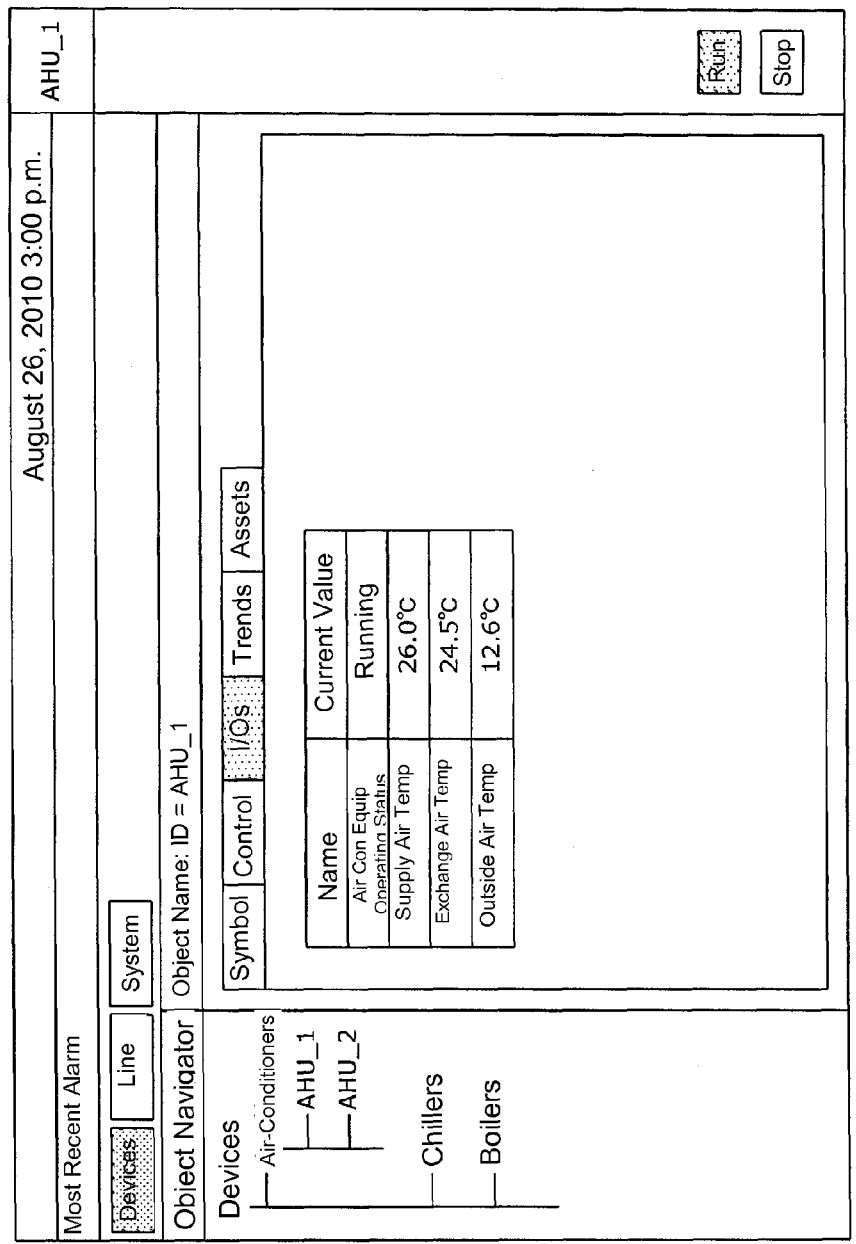
FIG. 18 is an example of a screen display of device data of the category "I/O."
Figure 19:
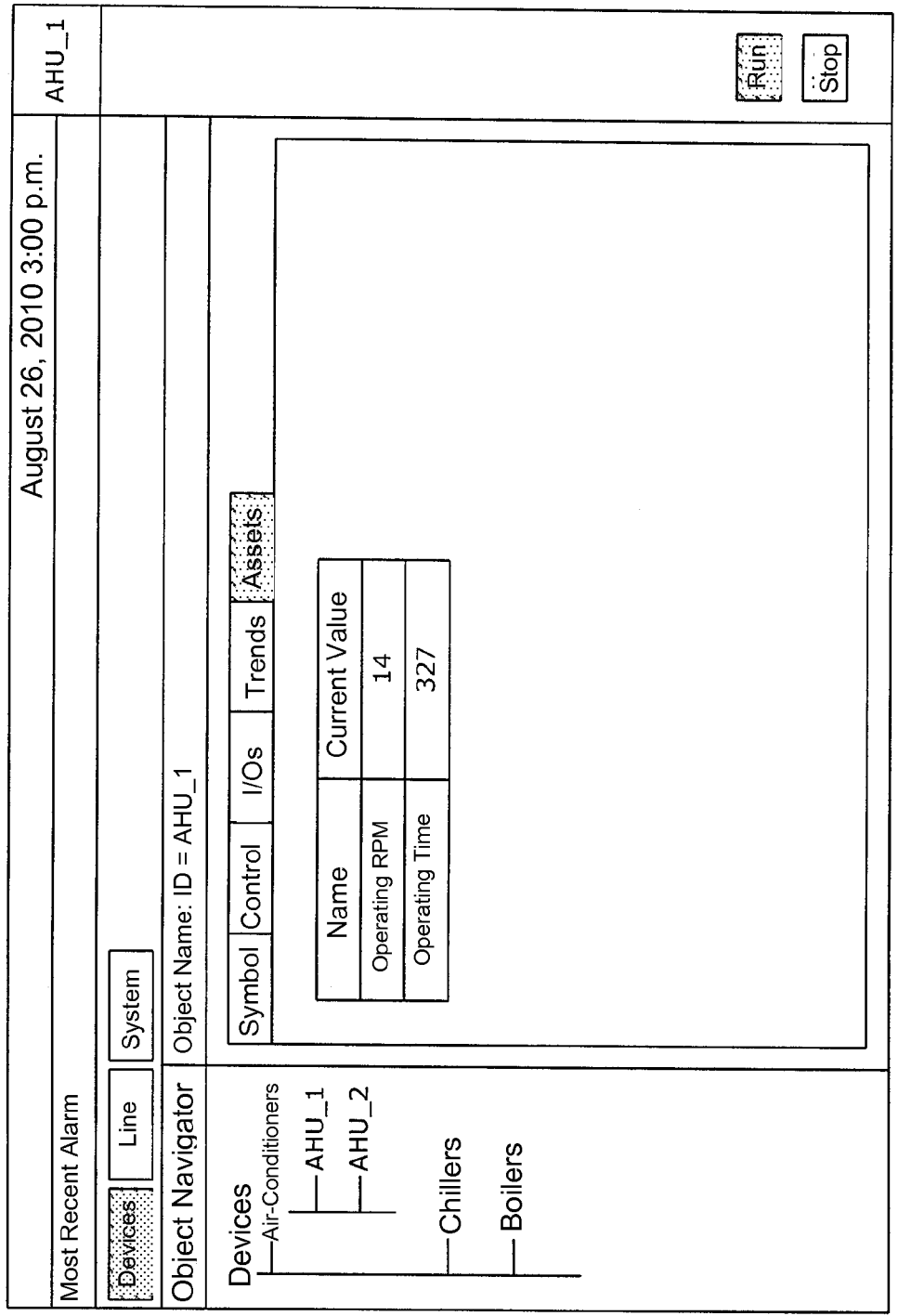
FIG. 19 is an example of a screen display of device data of the category "Asset."

Consequently, when the "I/Os" tag is clicked with the mouse to perform a display data switching request operation, then, as illustrated in FIG. 18, the device data wherein the category is "I/O", that is, the device data for items "A001" through "A004" will be displayed in the screen. Moreover, if the "Assets" tag is clicked with the mouse to perform a display data switching request operation, then, as illustrated in FIG. 19, the device data wherein the category is "Asset," that is, the device data for items "A011" and "A012" will be displayed in the screen.

Effects of the Yet Another Example

In this way, in the Yet Another Example, it is possible to switch the display to a screen of device data wherein the device data acquired by the data processing portion has category identifying information of a type indicated by a display data switching request operation in response to a display data switching request operation for the device data by the display processing portion 15C, by including, in the screen file 14D, category identifying information indicating the type of device data for each data identifying information.

This makes it possible to make arbitrary modifications to display formats of the display data, such as adding or modifying new data or modifying the data that is displayed in a given screen, through the extremely simple operation of setting a category for each device data in the screen file 14D.

Note that while in the Yet Another Example the explanation was for a case wherein the device data written in any given screen file 14D has already all been acquired from the devices 31 by the data processing portion 15B and the data processing through the processing scripts corresponding to these device data has already been completed when the display data switching request operation is first performed, there is no limitation thereto. For example, instead when the display data switching request operation is first performed, the device data acquisition and data processing according to the processing scripts on these device data may have been performed for only the device data pertaining to the display data of the category specified by default in the screen file 14D, and then, in response to the display data switching request operation, the device data may be acquired, and the data processing according to the processing script for the applicable device data may be performed for only the device data of the specified category.

Expanded Examples

While the present invention was explained above in reference to forms of embodiment, the present invention is not limited by the forms of embodiment set forth above. The structures and details of the present invention may be modified in a variety of ways, as can be understood by those skilled in the art, within the scope of the present invention.

The invention claimed is:

1. A facilities controlling device comprising:
a processor;
memory, operatively coupled to the processor, the memory comprising instructions and data comprising:
storage, which stores:
a plurality of image files used when displaying various types of devices, which structure facilities, in a screen using symbols,
a plurality of display script files used when displaying the image files in a screen,
a plurality of processing script files used when processing device data acquired from the devices, and
a screen file, for each screen corresponding to an objective of control, including:
image file identifying information indicating the image file for the device to be displayed in the screen,
display script file identifying information indicating the display script file for the image file, data identifying information indicating the device data to be displayed in the screen, and processing script file identifying information indicating the processing script file for the device data;

a file acquirer that acquires, from the storage, the screen file pertaining to the screen in response to a display request operation specifying any given screen, and acquires the corresponding image file, display script file and processing script file from the storage, based on the image file identifying information, the display script file identifying information, and the processing script file identifying information written in the screen file;

a device data decoder that acquires, from a device, device data corresponding to the data identifying information written in the screen file acquired by the file acquirer, and performs data processing on the acquired device data based on the processing script written in a processing script file corresponding to the device data obtained by the file acquirer; and a display that displays, in a screen, the device data produced by the device data decoder and the symbol of the image file acquired by the file acquirer, based on the display script written in the display script file acquired by the file acquirer.

2. The facilities controlling device as set forth in claim 1, wherein the screen file includes screen identifying information for indicating a screen file pertaining to a transition destination screen for transitioning from a screen, and the file acquirer acquires, from the storage, the screen file pertaining to the transition destination screen, to be displayed replacing the screen, based on the screen identifying information included in the screen file in response to a display switching request operation to the transition destination screen.

3. The facilities controlling device as set forth in claim 1, wherein the screen file includes category identifying information for indicating a type of device data for each data identifying information, and the display switches the display to a screen of device data wherein the device data obtained by the device data decoder are device data having category identifying information of a type indicated by the display data switching request operation.

4. A screen displaying method comprising:

a storing step for storing in a storage location:

a plurality of image files used when displaying various types of devices, which structure facilities, in a screen using symbols, a plurality of display script files used when displaying the image files in a screen, a plurality of processing script files used when processing device data acquired from the devices, and a screen file, for each screen corresponding to an objective of control, including image file identifying information indicating the image file for the device to be displayed in the screen, display script file identifying information indicating the display script file for the image file, data identifying information indicating the device data to be displayed in the screen, and processing script file identifying information indicating the processing script file for the device data;

a file acquiring step for acquiring by a file acquirer, from the storage location, the screen file pertaining to the screen in response to a display request operation specifying any given screen, and for acquiring the corresponding image file, display script file and processing script file from the storage location, based on the image file identifying information, the display script file identifying information, and the processing script file identifying information written in the screen file;

a data processing step for acquiring, from a device, by a device data decoder, device data corresponding to the data identifying information written in the screen file acquired by the file acquirer, and performing data processing on the acquired device data based on the processing script written in a processing script file corresponding to the device data obtained by the file acquirer; and a display processing step for displaying by a display processing portion, in a screen, the device data produced by the device data decoder and the symbol of the image file acquired by the file acquirer, based on the display script written in the display script file acquired by the file acquirer.

5. A non-transitory computer-readable medium containing program instructions which when executed by a computer cause the computer to function as various portions that structure a facilities controlling device comprising:

storage, which stores:

a plurality of image files used when displaying various types of devices, which structure facilities, in a screen using symbols, a plurality of display script files used when displaying the image files in a screen, a plurality of processing script files used when processing device data acquired from the devices, and a screen file, for each screen corresponding to an objective of control, including image file identifying information indicating the image file for the device to be displayed in the screen, display script file identifying information indicating the display script file for the image file, data identifying information indicating the device data to be displayed in the screen, and processing script file identifying information indicating the processing script file for the device data;

a file acquirer that acquires, from the storage, the screen file pertaining to the screen in response to a display request operation specifying any given screen, and acquires the corresponding image file, display script file and processing script file from the storage, based on the image file identifying information, the display script file identifying information, and the processing script file identifying information written in the screen file;

a device data decoder that acquires, from a device, device data corresponding to the data identifying information written in the screen file acquired by the file acquirer, and performs data processing on the acquired device data based on the processing script written in a processing script file corresponding to the device data obtained by the file acquirer; and a display processing portion that displays, in a screen, the device data produced by the device data decoder and the symbol of the image file acquired by the file acquirer, based on the display script written in the display script file acquired by the file acquirer.

* * * * *